(12) United States Patent
Kahl

(10) Patent No.: US 6,461,046 B2
(45) Date of Patent: Oct. 8, 2002

(54) SYSTEM FOR ADJUSTING PLAY IN A LINEAR GUIDE

(76) Inventor: Helmut Kahl, Fossbrink 2, D-32457 Porta Westfalica (DE)

(*) Notice: Subject to any disclaimer, the term of this patent is extended or adjusted under 35 U.S.C. 154(b) by 0 days.

(21) Appl. No.: 09/825,344

(22) Filed: Apr. 4, 2001

(65) Prior Publication Data

US 2002/0009241 A1 Jan. 24, 2002

(30) Foreign Application Priority Data

Apr. 4, 2000 (DE) .......................................... 100 16 606

(51) Int. Cl.[7] .............................................. F16C 29/06
(52) U.S. Cl. .......................................... 384/40; 384/45
(58) Field of Search .............................. 384/40, 45, 43, 384/44

(56) References Cited

U.S. PATENT DOCUMENTS 4,743,124 A * 5/1988 Blaurock ..................... 384/45
5,161,896 A * 11/1992 Hofling et al. ................ 384/44

* cited by examiner

Primary Examiner—Lenard A. Footland
(74) Attorney, Agent, or Firm—Browdy and Neimark, P.L.L.C.

(57) ABSTRACT

A system for adjusting the play in a linear guide, the linear guide incorporating a slide provided with running surfaces and guided between guide surfaces of a guide element. The linear guide also includes bearing members that are disposed between running surfaces and guide surfaces, with at least one running surface held on the slide elastically displaceable in the cross-direction and adjustable by a spreader element against a guide surface assigned to the running surface. This renders the play between the slide and the guide element adjustable. The spreader element comprises a hollow body that incorporates a continuous through-opening extending in the longitudinal direction and is elastically displaceable or deformable by an adjusting element cooperating with the same.

20 Claims, 1 Drawing Sheet

SYSTEM FOR ADJUSTING PLAY IN A LINEAR GUIDE

BACKGROUND OF THE INVENTION

1. Technical Field of the Invention

The present invention relates to a system for adjusting play in a linear guide, said linear guide incorporating a slide provided with running surfaces and guided between guide surfaces of a guide element, also bearing members that are disposed between running and guide surfaces, with at least one running surface held on the slide elastically displaceable in the cross-direction and adjustable by means of a spreader element against a guide surface assigned to the running surface, thus rendering the play between the slide and the guide element adjustable.

2. Object and Summary of the Invention

The object of the invention consists of improving a system in a linear guide in such a way that a spreader element is accessible as easily as possible, thus rendering the play between the slide and guide element adjustable as easily as possible.

This object is met in the system in such a way that the spreader element comprises a hollow body that incorporates a continuous through-opening in the longitudinal direction and is displaceable and/or elastically deformable by means of an adjusting element cooperating with the same.

The hollow body is preferably designed as a cylindrical tubular section.

Provision may be made for an adjusting screw that engages into a threaded bore in the slide to radially act upon an outer circumference surface of the hollow body.

The through-opening is advantageously dimensioned such that it permits in any adjustment position the passage of a drive spindle.

The slide is preferably substantially Y-shaped in its cross-section in the region of the running surfaces, and two leg sections that carry the running surfaces are connected elastically deformable, particularly in one piece, to a web section carrying a base section, and the spreader element is disposed in a cutout between the leg sections.

The adjusting screw is advantageously guided through the web section in such a way that it is accessible from the side of the base section.

Each leg section preferably carries two running surfaces.

The cutout housing the spreader element may have a substantially oval cross-section shape.

In a preferred embodiment, the slide and/or guide element are composed of extruded profiles, particularly of light metal.

The running surfaces and/or guide surfaces may be formed by hardened insert or attachment strips.

The use of recirculating linear ball bearing guides is preferred.

The invention furthermore relates to a linear guide system having a system for adjusting the play according to the invention

BRIEF DESCRIPTION OF THE DRAWINGS

The invention will be explained below based on an embodiment, with reference made to a drawing, in which.

DETAILED DESCRIPTION OF THE PREFERRED EMBODIMENT(S) OF THE INVENTION

Figure 1:
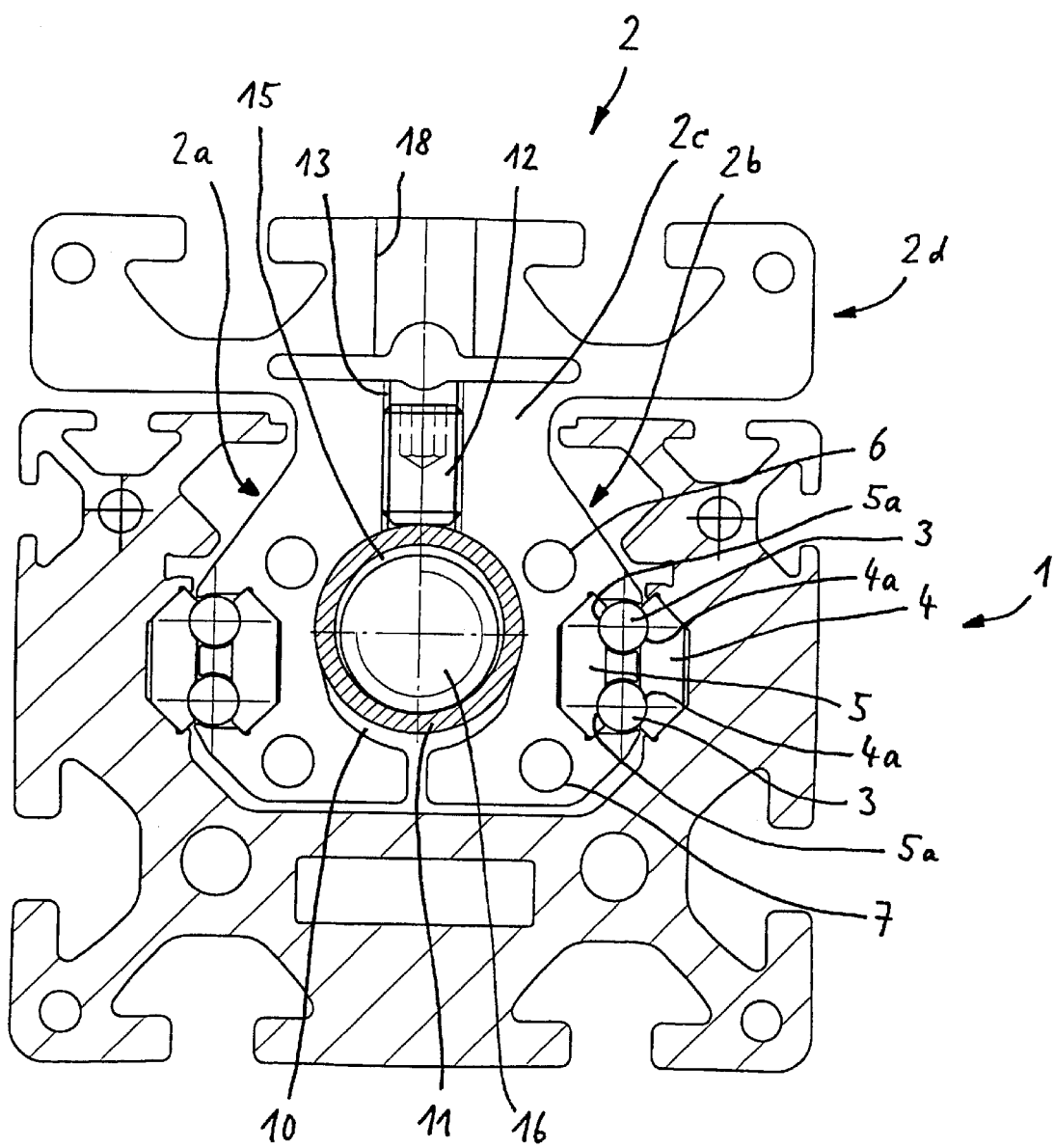
FIG. 1 shows a schematic drawing of a section of a linear guide system with a system for adjusting the play according to the invention.

The linear guide system shown in FIG. 1 comprises a guide element or guide rail 1 with a substantially U-shaped cross-section and a slide 2 that is slideably run in the guide rail 1, said guide rail and slide being composed of extruded light-metal profiles.

A linear guidance of the slide 2 along the guide rail 1 that is practically free from play and low-friction is implemented with recirculating linear ball bearing guides in such a way that steel balls 3 are guided between hardened insert strips 4 that are inserted into the guide rail 1 and form guide surfaces, and matching insert strips 5 that are inserted into the slide 2 and form running surfaces. In the discussed example there are altogether four recirculating linear ball bearing guides wherein the balls 3 are deflected at frontal ends of the slide 2 and guided back in guide channels 6, 7 that extend parallel to the respective running and guide surfaces of the insert strips.

As FIG. 1 further shows, the slide 2 is designed Y-shaped in its region that is encompassed by the guide rail 1 and in the region of the recirculating linear ball guides, respectively, and incorporates two leg sections 2a, 2b and a common web section 2c. Adjoining the web section 2c is a base section 2d that serves to hold and fasten components or the like that are to be moved with the slide.

The leg sections 2a and 2b encompass a central cutout 10 having a substantially circular and ovally widened cross-section that extends axially and in the direction of movement, which houses in its circular cross-section area a tubular spreader element 11. The substantially oval cross-section region adjoining the circular cross-section region of the cutout 10 is formed such that a widening of the circular cross-section region is created that tapers in a wedge shape.

An adjusting element, which, in the present embodiment, is formed by an adjusting screw 12, is screwed in by means of a threaded bore 13 extending through the web section 2c of the slide and acts upon the outer circumference of the tensioning element 11.

As is apparent from FIG. 1, the tubular section 11 is displaced downward inside the cutout 10 and into the oval region of the cutout when the adjusting screw 12 is screwed in further, and simultaneously, depending on its rigidity, ovalized to a greater or lesser degree, so that a spreading effect is generated onto the two leg sections 2a, 2b of the slide, through which these and the insert strips 5 that are connected to same are moved apart. This movement is within a range of a few one hundredths or, at the most, one tenths of a millimeter, so that an elastic deformation of the leg sections and spreader element is ensured.

The advantage of the inventive system lies in the fact, among others, that the design of the spreader element in the form of a tubular section leaves a central axial through-opening 15 for a drive spindle 16 or the like and that an adjustment of the play is possible without difficulty from outside, simply by screwing in or out the adjusting screw 12 by means of a tool that is inserted through a bore 18 in the base section 2d.

| Reference Numerals | |
| --- | --- |
| 1 | Guide rail (guide element) |
| 2 | Slide |
| 2a, 2b | Leg sections |
| 2c | Web section |

-continued

| | Reference Numerals |
|---|---|
| 2d | Base section |
| 3 | Ball (bearing member) |
| 4 | Insert strip |
| 4a | Guide surface |
| 5 | Insert strip |
| 5a | Running surface |
| 6 | Guide channel |
| 7 | Guide channel |
| 10 | Cutout |
| 11 | Tubular section (spreader element) |
| 12 | Adjusting screw (adjusting element) |
| 13 | Threaded bore |
| 15 | Through-opening |
| 16 | Drive spindle |
| 18 | Bore |

What is claimed is:

1. A system for adjusting play in a linear guide, said linear guide incorporating a slide (2) provided with running surfaces (5a) and guided between guide surfaces (4a) of a guide element (1), also bearing members (3) that are disposed between running surfaces (5a) and guide surfaces (4a), with at least one running surface (5a) held on the slide (2) elastically displaceable in a cross direction and adjustable by means of a spreader element (11) against a guide surface (4a) assigned to the running surface (5a), thus rendering play between the slide (2) and the guide element (1) adjustable, wherein the spreader element comprises a hollow body (11) that incorporates a continuous through-opening (15) extending in a longitudinal direction and is elastically displaceable or deformable by means of an adjusting element (12) cooperating with the spreader element.

2. A system according to claim 1, wherein the hollow body (11) is formed as a cylindrical tubular section.

3. A system according to claim 2, wherein the through-opening (15) is dimensioned such that it permits the passage of a drive spindle (18) in any adjustment position.

4. A system according to claim 2, wherein the adjusting element is an adjusting screw (12) that engages into a threaded bore (13) in the slide (2) radially acts upon an outer circumference surface of the hollow body (11).

5. A system according to claim 2, wherein a cutout (10) housing the spreader element (11) has an oval cross-section shape.

6. A system according to claim 2, wherein the slide (2) and guide element (1) are composed of extruded metal profiles.

7. A system according to claim 2, wherein the running surfaces (5a) and guide surfaces (4a) are formed by hardened insert 6 or attachment strips (5, 4).

8. A system according to claim 2, comprising recirculating linear ball bearing guides.

9. A system according to claim 1, wherein the adjusting element is an adjusting screw (12) that engages into a threaded bore (13) in the slide (2) radially acts upon an outer circumference surface of the hollow body (11).

10. A system according to claim 9, wherein a cross-section of the slide (2) in a region of the running surfaces (5a) is substantially Y-shaped, wherein two leg sections (2a, 2b) that carry the running surfaces (5a) are connected elastically deformable, to a web section (2c) carrying a base section (2d) and the spreader element (11) is disposed between the leg sections (2a, 2b).

11. A system according to claim 10, wherein the adjusting screw (12) is guided through the web section (2c) so that it is accessible from a side of the base section (2d).

12. A system according to claim 11, wherein each leg section (2a, 2b) carries two running surfaces (5a).

13. A system according to claim 9, wherein the through-opening (15) is dimensioned such that it permits the passage of a drive spindle (18) in any adjustment position.

14. A system according to claim 9, wherein a cutout (10) housing the spreader element (11) has an oval cross-section shape.

15. A system according to claim 9, wherein the slide (2) and guide element (1) are composed of extruded metal profiles.

16. A system according to claim 1, wherein the through-opening (15) is dimensioned such that it permits the passage of a drive spindle (18) in any adjustment position.

17. A system according to claim 1, wherein a cutout (10) housing the spreader element (11) has an oval cross-section shape.

18. A system according to claim 1, wherein the slide (2) and guide element (1) are composed of extruded metal profiles.

19. A system according to claim 1, wherein the running surfaces (5a) and guide surfaces (4a) are formed by hardened insert 6 or attachment strips (5, 4).

20. A system according to claim 1, comprising recirculating linear ball bearing guides.

* * * * *